D. C. NIEMI.
MORTISING MACHINE.
APPLICATION FILED OCT. 21, 1913.
1,102,678.
Patented July 7, 1914.
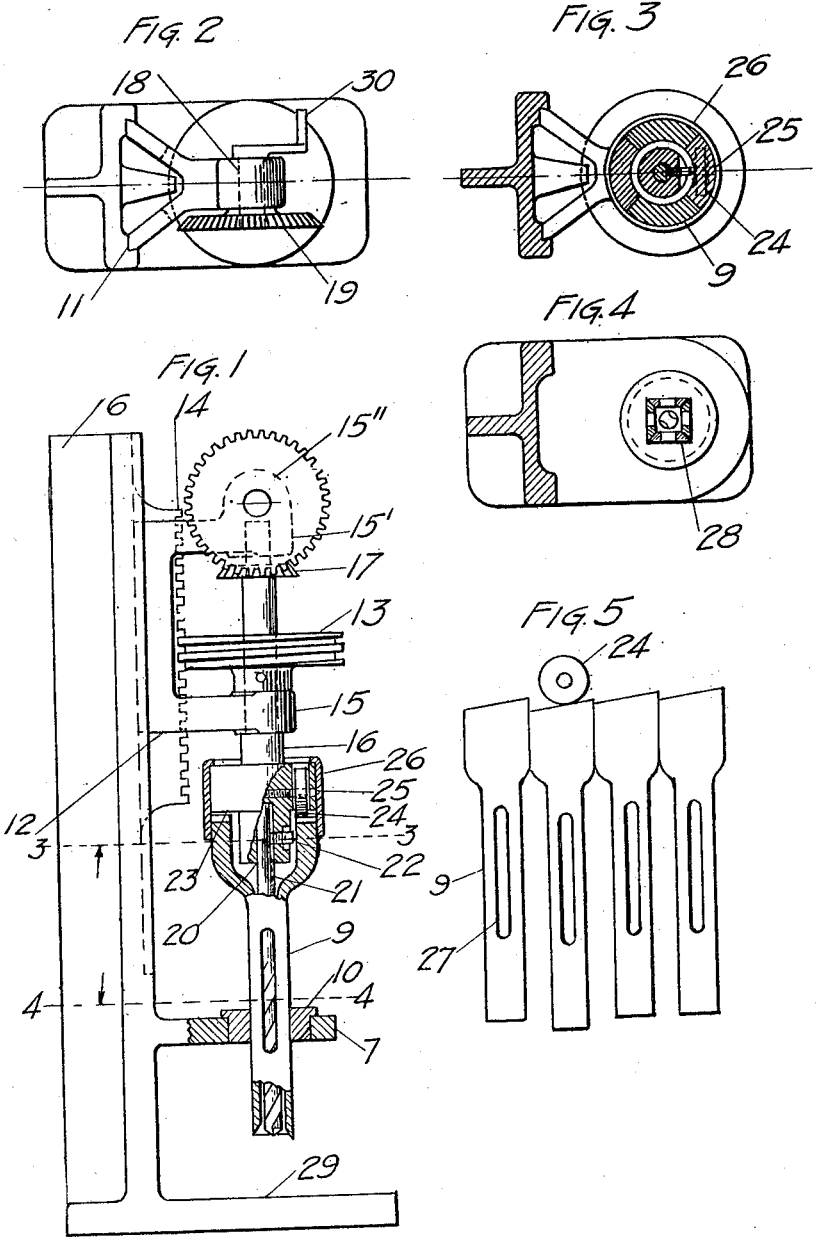

UNITED STATES PATENT OFFICE.

DAVID CONSTANTINE NIEMI, OF GLASSPORT, PENNSYLVANIA.

MORTISING-MACHINE.

1,102,678.

Specification of Letters Patent.   Patented July 7, 1914.

Application filed October 21, 1913.   Serial No. 796,414.

*To all whom it may concern:*

Be it known that I, DAVID CONSTANTINE NIEMI, a citizen of Finland, and a resident of Glassport, in the county of Allegheny and the State of Pennsylvania, have invented a new and Improved Mortising-Machine, of which the following is a full, clear, and exact description.

This invention relates to a mortising-machine of that type whereby triangular, square, rectangular, hexagonal, elliptical, or any irregularly shaped holes can be conveniently cut at a single operation.

The invention has for one of its objects to improve and simplify construction of apparatus of this character, so as to be reliable and convenient in use and composed of comparatively few parts, so designed as to occupy smallest possible space.

Another object of the invention is the provision of novel operating means for auger and chisels to conveniently cut a finished hole in wood or any material for which the machine is adapted.

These and other objects in view, the invention comprises various novel features of construction and arrangement of parts which will be more fully described hereafter and set forth in the claim appended hereto.

In accompanying drawings, which illustrate one embodiment of invention, and wherein similar reference characters are employed to designate corresponding parts, Figure 1 is a side view of the device arbitrarily chosen the one designed to cut a square hole. The view shows section through chisels and chisel feeder mechanism. Fig. 2 is a plan of the device. Fig. 3 is an upper sectional view on the line 3—3 Fig. 1. Fig. 4 is a lower sectional view on the line 4—4 Fig. 1. Fig. 5 is a development of chisel-ram as it appears in the machine being described.

While I have shown the invention in its embodiment as a machine for drilling square holes, I desire it to be understood that the features of this invention can be applied to mortising machines adapted for cutting any regularly or irregularly shaped holes.

Referring to the drawings, the numeral 6 designates a frame which supports bearing-block 12 movable up and down in the ways 11. Between the ways 11 and parallel to them is mounted a rack 14, which meshes with the worm gear 13 on the spindle 16. The lower end of the frame is adapted to form a base for the machine and a suitable table 29 for supporting the stock or material to be operated upon. In addition to the above the frame 6 carries a bracket 7 at a convenient distance from the table 29 to suit the material to be operated upon. The bracket 7 is adapted to receive the chisel-guide 10, functions of which will be more fully described later. The bearing-block 12 is adapted to slide up and down in the ways 11 on frame 6, and supports spindle 16 in the bearings 15 and 15′, and the crank shaft 18 in the bearing 15″.

The crank shaft 18 carries the bevel gear 19 at one end and the crank 30 on the other end. The bevel gear meshes with the pinion 17 on the spindle. If it is desired to operate the machine by machine power, a pulley or equivalent transmission means may be substituted for the crank.

In bearings 15 and 15′ revolves a spindle 16 which carries the pinion 17. The pinion 17 meshes with the bevel gear 19, thus transmitting the motion from the crank shaft to the spindle. The spindle also supports the worm wheel 13 which meshes with the rack 14 on the frame. As the pinion 17 and the worm wheel 13 are rigidly mounted on the spindle, and their hubs bear against the ends of the bearings 15′ and 15 respectively, the spindle 16 is held in a definite relation to the bearing-block 12. From this it is clear that when the spindle is rotated it is carried up or down in relation to the frame, and as it carries the auger and the chisels at its lower end, it provides the feeding mechanism in the machine.

As shown in Fig. 1 the spindle 16 supports the auger 21 inserted in hole 20 and secured therein by the set screw 22. The auger 21 operates through the hollow chisel-ram 9, which is composed of four chisels. To hold the chisels in proper relation to each other and to the rest of the machine the guides 10 and 26 are provided. The lower end of the ram has a uniform section and a sliding fit in the guide 10, while the upper end is enlarged to give sufficient room for the enlargement of spindle. The section of the chisel-ram which runs through the guide 10 is square as shown at 28 Fig. 4, while the upper end of it forms a cylinder as shown in Fig. 3. The cylindrical guide 26 (see Figs. 1 and 3) rests on the upper shoulder of the enlargement 23 on the spindle 16 and prevents the chisels from spreading, while the guide 10 performs the similar function at the lower end of the chisel-ram. The up and down play of the chisels is checked by the lower shoulder of enlargement 23 and the material to be operated upon respectively. The holes 27 are provided in the chisels to eliminate chips from the ram.

The operating mechanism for the chisels consists of a roller 24 revolving on the pin 25 mounted on the enlargement 23 as shown in Fig. 1. The upper ends of chisel are cut oblique to form an incline for the roller. The successive chisels and inclines are shown in Fig. 5. When the machine is operated the spindle is carried down as heretofore described and as the chisels rest on the material to be operated upon, the roller 24 has a continuous incline upon which to roll. As it travels around with the spindle, it gives successive pressures to the chisels in the ram.

When the device is used the operator turns the crank 30, consequently the spindle 16 turns. The worm wheel 13 performs the action of feeding the auger 21, and the roller 24 feeds the chisels in conjunction with the auger. The chisels cut the sides of the hole while the auger removes the chips and cuts open the central portion of the hole.

From the foregoing description taken in connection with the accompanying drawings the advantages of the method of operation and of the apparatus shown will be readily understood by those skilled in the art to which the invention appertains; and while I have described the apparatus which I now consider to be the best embodiment thereof, I desire to have it understood that the apparatus shown is merely illustrative and such changes as are within the scope of the appended claim may be made when desired.

Having thus described my invention I claim as new and desire to secure by Letters Patent:

A mortising machine comprising a revolving spindle carrying an auger, means for revolving the spindle and feeding it longitudinally, a series of chisels forming a hollow cutter surrounding the auger and having each an inclined upper end, and a roller mounted in the revolving spindle and acting in succession on the series of chisels.

In testimony whereof I have signed my name to this specification in the presence of two witnesses.

DAVID CONSTANTINE NIEMI.

Witnesses:
THEOPHILUS HOKKANEN,
GEORGE SJOBLOM.

---

Copies of this patent may be obtained for five cents each, by addressing the "Commissioner of Patents, Washington, D. C."